Aug. 8, 1933.  L. P. HUTT  1,921,127
VOLTAGE COMPENSATED REFRIGERATOR STARTER
Filed April 30, 1930
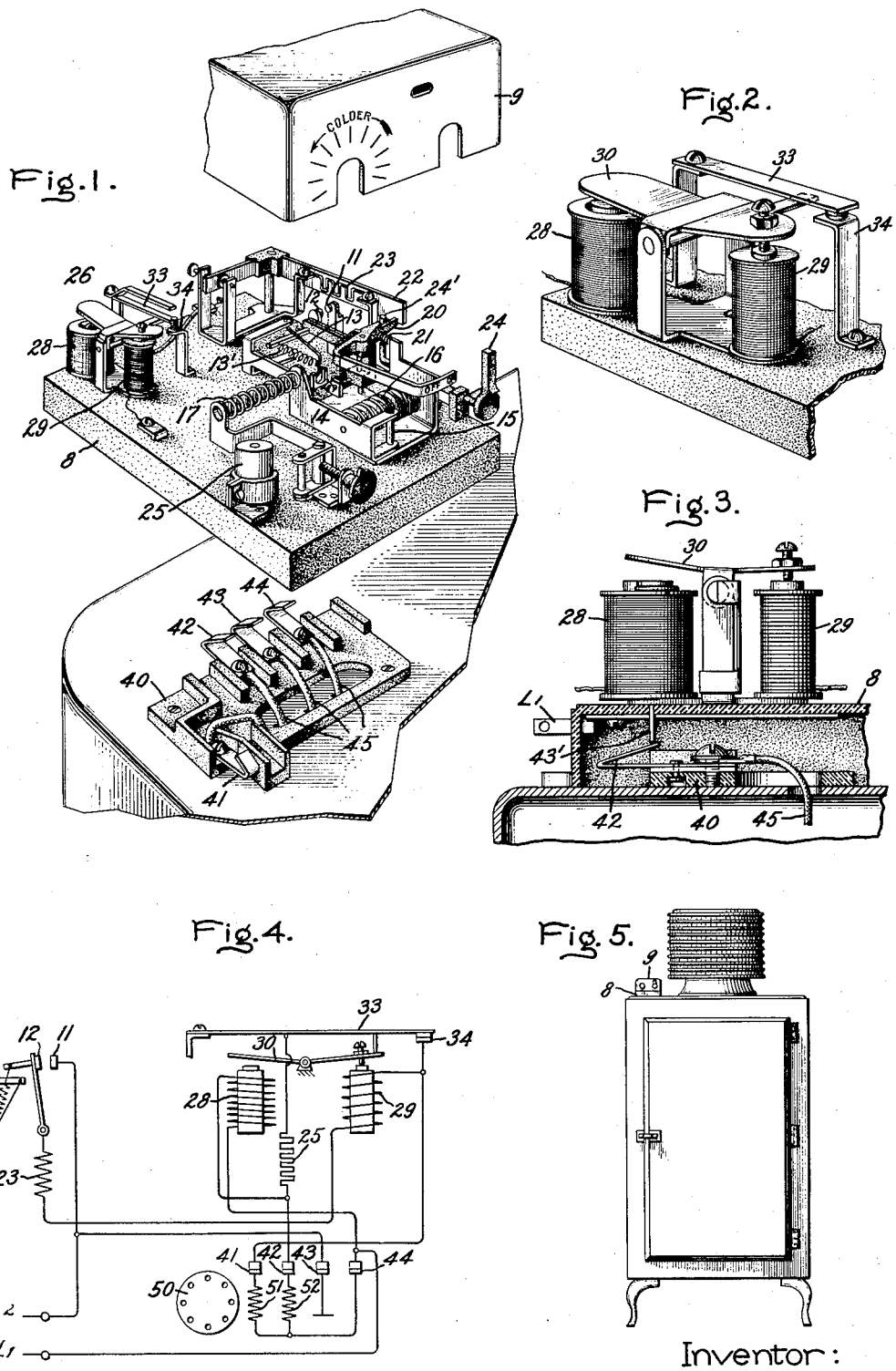
Inventor:
Leonard P. Hutt,
by Charles E. Mullan
His Attorney.

Patented Aug. 8, 1933

1,921,127

UNITED STATES PATENT OFFICE 1,921,127

VOLTAGE COMPENSATED REFRIGERATOR STARTER

Leonard P. Hutt, Schenectady, N. Y., assignor to General Electric Company, a Corporation of New York Application April 30, 1930. Serial No. 448,731

9 Claims. (Cl. 172—279)

My invention relates to control devices, more particularly a control device for starting an electrical motor of the split phase type.

My present invention is an improvement upon the device described and claimed in a copending application of C. A. Nickle, application No. 444,079 filed April 14, 1930, and assigned to the same assignee of my present invention.

A split phase motor, as is well known, is provided with a running winding and a starting winding, the starting winding usually being energized only to start the motor. After the motor is started, the starting winding is deenergized.

One method used to accomplish the above action is to connect a normally open starting relay in series with the running winding of the motor. When a circuit is closed through the motor and sufficient current passes through the relay, the starting relay closes its contacts to place the starting winding across the lines to start the motor. When the motor comes up to speed the current through the running winding decreases and the relay contacts return to the normally open position, thus deenergizing the starting winding. This method is open to the objections pointed out below.

In practice voltages from 90 to 125 volts are encountered. It will therefore be seen that where such a starting relay is designed to operate around 90 volts to close the circuit and to open the circuit when the motor comes up to speed the same relay although it might close at 125 volts would probably not operate at the proper time if at all to open the starting winding. Similarly, if the relay is designed to pick up around 110 volts, it will not pick up if a much lower voltage is applied thereto and damage to motor windings will result. It is therefore desirable to have a relay which will operate independently of these variations in voltage.

An automatic thermal time element overload protective device is usually provided to open the circuit to the motor which depends on the currents flowing therethrough for its operation. In case the normally open relay does not quickly pick up the contacts on low voltages to place the starting winding across the line, the current passing through the running winding is the only current passing through the protective device to open the circuit. Thus the automatic overload means may fail to function for a sufficient length of time to cause damage to the motor running winding.

Thus in order to avoid this danger it is desirable to use a normally closed starting relay for the split phase motor so that the starting winding is initially connected to be energized on starting but deenergized after the motor approaches running speed. This will operate the thermal overload protective device much more quickly than where the starting winding is initially opened because both of the motor windings are energized on starting and draw current which passes through the protective device. Furthermore, with a normally closed relay the voltage range for satisfactory operation is much improved since with both windings of the motor energized at the start, the maximum possible starting torque is immediately provided. Moreover, should the motor stall during operation, the normally closed relay immediately places both windings across the line so that the protective device in the circuit will operate quickly.

It is therefore an object of my invention to provide a control device for a split phase motor which initially connects both windings across the line and opens the circuit thru the starting winding when the motor reaches a predetermined speed.

A difficulty however, arises when an attempt is made to provide closed contacts for the voltage compensated relay described in the Nickle application referred to above. In the Nickle device the controlling contacts are initially open. Two electromagnetic coils electrically connected to the motor circuit are utilized to control this switch, by means of a pivoted armature placed adjacent the coils. The current coil which is placed in series with the running winding is depended upon for closing the circuit controlling member upon starting to place the starting winding across the lines. The voltage coil which is placed in parallel with the running winding and has practically full line voltage applied thereto is depended upon to open the switch after the motor has been started. The differential action of these coils is independent of the applied voltage within wide limits.

In case the switch in Nickle's device should be provided with contacts which are initially closed, the current coil must be depended upon to maintain the contacts closed while the motor is starting and the voltage coil must be depended upon to open the circuit through the starting winding of the split phase motor after running speed is reached. However, with such a rearrangement of the Nickle device, whenever the motor stalls although the pull of the current coil is increased due to the stalled current therethrough, the circuit controlling member will not be closed because after the voltage coil has actuated the armature of the circuit controlling member to deenergize the starting winding, a closed magnetic circuit is completed through the armature and the voltage coil. As a result, the pull of the voltage coil is much greater than the pull of the current coil and prevents reenergization of the starting winding under stalled conditions.

Hence, it is a further object of my invention to provide a motor control device of the above character which will respond to stalled conditions to quickly operate the motor protective devices to open the circuit to the motor.

Other objects will appear hereinafter.

Although I describe my invention in connection with a thermostatically operated switch mechanism used to control refrigerator apparatus, and which is described and claimed in my copending application, Serial No. 432,204, filed Feb. 28, 1930, it can be used readily wherever it is necessary to start a split phase motor.

In the preferred embodiment of my invention I make use of a thermostatically operated switch mechanism provided with an overload trip mechanism to open the switch in case of overload. The circuit controlling member for the split phase motor which is initially closed to place both windings of the motor across the line is controlled by means of two electroresponsive coils placed adjacent the circuit controlling member. One of the coils, the current coil, is placed in series with the running winding, the other, the voltage coil, is placed across the starting winding of the motor. The two coils are electrically balanced against each other and the pull exerted by these coils is independent of the applied voltage within wide limits. By providing initially closed contacts I obtain the advantages pointed out above, and by placing the voltage coil across the starting winding a lighter coil construction is the result, since the coil can be designed for induced voltages in the starting winding and need not be designed for full line voltage as is necessary in the Nickle device. When the thermostatically operated switch mechanism closes to energize the motor, both windings are simultaneously energized. The large starting current through the current coil maintains the circuit controlling member in closed position until after the motor is started, at which time the circuit controlling member responds to the voltage coil to open the circuit through the starting winding. Since the motor is now rotating, the induced voltage in the starting winding continues to energize the voltage coil to maintain the contacts open during running of the motor.

In case of overload when the motor stalls the induced voltage in the starting winding decreases and finally passes through zero and the current through the current coil increases. Thus the pull of the voltage coil is reduced to zero and the pull of the current coil overcomes the pull of the voltage coil permitting the circuit controlling member to close to place the starting winding across the lines, thereby increasing the current through the automatic overload device to trip the switch mechanism to take the motor off the line.

A better understanding of the device will be obtained by reference to the drawing and following detailed description.

Fig. 1 is an exploded view of a switch mechanism embodying my invention.

Fig. 2 is an enlarged perspective view of my invention.

Fig. 3 is a cross-sectional view of my invention.

Fig. 4 is a schematic diagram of the electrical connections.

Fig. 5 shows the position of the switch mechanism mounted upon a well-known type of refrigerator.

Referring to Fig. 1, the contacts 11 and 12 of the switch mechanism are caused to open and close in response to the action of the sylphon bellows 16 to control the refrigerator motor. The pivoted member 13 and the spring 13' serve to connect a pivoted lever 14 to the switch contacts 11 and 12 to open the contacts with a snap action. This lever mechanism is pivotally mounted at 15. The sylphon bellows which is a thermostatic element controlling the pivoted lever 14 is opposed by the spring 17 which determines the temperature at which the switch will open and close. A member 20 is pivoted adjacent the pivoted element carrying the contact 12 and is biased to open the switch mechanism by means of a biasing spring 21. This pivoted member 20 is held against its bias by means of the bimetallic strip 22 which in response to heating of the resistor 23 on overload assumes a curved shape to release the pivoted member 20 to open the switch mechanism. A manually operated element provided with the adjusting handle 24 and the operating element 24' cooperates with the pivoted member 20 and the bimetallic strip 22 to release the pivoted bias member from the bimetallic strip 22 to open the contacts 11, 12. A starting resistor 25 is also mounted upon the base 8. The relay mechanism is designated generally by the numeral 26. A cover 9 is provided for the switch mechanism.

Mounted on the refrigerator top is the sub-panel 40 upon which are mounted the resilient contact members 41, 42, 43 and 44 which are connected to the motor circuit by means of the conductors 45. The connections to the motor circuit are shown in Fig. 4.

In Fig. 3 it will be seen how the base 8 is mounted over the sub-panel 40 and how the resilient contact members 42 cooperate with the rigid contact members 43' extending through the base to complete the necessary electrical connections.

Referring to Fig. 4, the motor 50 is provided with the running winding 51 and the starting winding 52. The motor, of course, is mounted within the refrigerator and conductors lead from the motor to the resilient members 41, 42 and 44 mounted upon the subpanel 40. The resilient member 43 is connected to apparatus which is not concerned with this invention. Connected in series with the running winding 51 is the series electro-responsive coil 29 toward which the armature 30 is normally biased. This coil is also connected to the switch and the resistor 23. The coil 28 is connected across the starting winding 52. The starting resistance 25 for limiting the starting current is in series with the starting winding and the relay switch arm 33 which is biased to a closed position. It will be understood, of course, that the electro-responsive coils of the relay, the starting resistor, the switch and heating element are mounted upon the base 8 and that the connections to the motor are made by means of the rigid members extending through the base which are in contact with the resilient members on the sub-panel. The connections to the lines are designated by $L_1$ and $L_2$. These plug connections are carried by the base 8.

The operation of the device is as follows. When the thermostatic responsive device 15 closes the switch contacts 12 and 11, the running winding and the starting winding are placed across the lines $L_1$ and $L_2$. The voltage across the starting winding 52 is full line voltage less the drop through the resistor 25. Upon the starting of the motor, a large inrush of current passes through the running winding 51 and series coil 29. This maintains the armature 30 in its biased position toward the series coil 29 so that current passes through the running winding. As the motor comes up to speed and the current through the running winding decreases, the pull exerted by the parallel coil 28 overcomes the pull exerted by the series coil 29. This causes the armature 30 to be tripped toward the parallel coil opening the contacts carried by the members 33 and 34 thus opening the circuit to the line from the starting winding 52. Since the motor is now running, the induced voltage in the starting winding is sufficient to energize the coil 28 to retain the armature in its circuit-opening position. Should the motor stall during operation as the current through the running winding increases and the voltage in the starting winding drops to zero, the armature is again moved to its initial position permitting the contacts carried by the relay to be closed. This permits a large amount of current to flow through the heating grid 23 which heats up quickly and opens the switch thus protecting the motor windings from overload. Due to the fact that both windings are placed across the line when the motor is started up, the motor will start on low voltage since it does not depend upon the operation of a relay to place the starting winding across the line.

Since the two coils are electrically balanced against each other in the relay, the relay will respond over a wide range of voltages and since both windings of the motor are placed across the line when the motor is stalled and during the starting, a larger current than ordinarily would flow if the starting winding were opened, passes through the resistor heater making the switch respond more quickly to take the motor off the line in case of overload. It will, therefore be seen that a lower voltage than normally required will operate the protective device.

The embodiment of the invention illustrated and described has been selected for the purpose of clearly setting forth the principles involved. It will be apparent, however, that the invention is susceptible of being modified to meet the different conditions encountered in its use and I, therefore, aim to cover by the appended claims all modifications within the true spirit and scope of my invention.

What I claim as new and desire to secure by Letters Patent of the United States is:

1. In a control device for a motor having a running winding and a starting winding, a switch for energizing said motor, a circuit controlling device for connecting the starting winding of said motor to be energized upon starting the motor, a plurality of electro-responsive devices for said circuit controlling device, one of said electro-responsive devices being connected to be responsive to the voltage across the starting winding to actuate said circuit controlling device to open the circuit to the starting winding, and another of said devices being responsive to the current through said running winding for rendering said first device ineffective while said motor is being started.

2. In combination, a split phase motor having a running winding and a starting winding, a switch for controlling the energization of the starting winding and biased to the closed position, electromagnetic means for controlling the switch having one winding connected to be energized responsively to the voltage across the starting winding for opening the switch and a second winding connected to be energized responsively to the current of the running winding for holding the switch closed during starting of the motor, said electromagnetic means being operative over a wide range independently of the applied voltage.

3. In combination, a split phase motor having a running winding and a starting winding, a circuit controlling device for said starting winding biased to the closed position, an electroresponsive means connected to be responsive to the voltage across said starting winding for controlling said device to open the starting winding circuit, and an oppositely acting electroresponsive means responsive to the current in the running winding for rendering said first electroresponsive means ineffective while the motor is being started, said electroresponsive means controlling said circuit controlling device independently of variations in the energizing voltages of the motor.

4. In combination, a motor provided with a starting winding and a running winding, a circuit controlling means biased to a closed position and connected to control the circuit through said starting winding to start said motor, an electroresponsive means in parallel with said starting winding for opening said circuit controlling means, and an electroresponsive device in series with said running winding to render said parallel means ineffective while said motor is being started, said parallel means being energized by the voltage induced in said starting winding for maintaining said circuit controlling member in the open position after said motor is started.

5. In combination, a split phase motor provided with a running winding and a starting winding, a switch mechanism for energizing said motor, a circuit controlling means biased to a closed position for providing a closed circuit through said starting winding to start the motor, a movable member biased to one position and movable to another position to open said circuit controlling means, an electromagnet connected in parallel with said starting winding for moving said movable member to open said circuit controlling means after said motor is started, an electromagnet connected in series with said running winding and electrically balanced against said parallel coil for maintaining said movable member in inoperative position until after said motor is started, said electroresponsive coils being operative over a wide range of applied voltages.

6. In combination, a split phase motor having a running winding and a starting winding, a switch for energizing said motor, a circuit controlling device for providing a closed circuit through said starting winding to start the motor, a pair of differentially acting electromagnets for controlling said circuit controlling device independently of variations in the energizing voltage of the motor, one of said electromagnets being connected in series with the running winding to maintain said circuit controlling device closed while said motor is being started and the other of said electromagnets being connected in parallel with the starting winding for opening the circuit controlling device after the motor is started whereby said second electromagnet is energized in accordance with the voltage induced in said starting winding after the motor is started, for maintaining said circuit controlling device open while said motor is running and for permitting said circuit controlling device to close when said motor stalls.

7. In combination, a split-phase motor having a running winding and a starting winding, means for energizing the motor to start the same, electro-responsive means having cooperating windings, one winding being connected to exert a force varying substantially directly with the current in the running winding, and the second winding connected to exert a force varying substantially directly with both the energizing and induced voltage across the starting winding, and circuit-controlling means associated with said electro-responsive means to be operated by the differential between said forces to deenergize the starting winding after the motor is started and to reenergize the starting winding whenever the motor stalls.

8. In combination, a split-phase motor having a running winding and a starting winding, means for energizing the motor, and a switch for controlling the starting winding having oppositely acting electro-responsive means, one winding exerting a force which varies substantially directly with the current in the running winding and tending to close the switch, and the other exerting a force which varies substantially directly with the voltage across the starting winding and tending to open the switch, whereby the starting winding is deenergized after the motor is started and is reenergized whenever the motor stalls.

9. In combination, a split-phase motor having a running winding in which the current varies from a relatively large starting value to a smaller running value as said motor comes up to speed and a starting winding in which the induced voltage varies from zero to some greater value as the motor comes up to speed, means for energizing the motor to start the same, electro-responsive means having cooperating windings, one winding being connected to exert a force varying substantially directly with the current in the running winding, and a second winding connected to exert a force varying substantially directly with both the energizing and induced voltage across the starting winding, and a circuit-controlling means associated with said electro-responsive means to be operated by the differential between said forces to deenergize the starting winding after the motor is started and to reenergize the starting winding whenever the induced voltage in said starting winding decreases to a predetermined value whenever thte motor stalls.

LEONARD P. HUTT.